United States Patent Office 3,666,512
Patented May 30, 1972

3,666,512
COMPOSITIONS OF FATTY ACID ANHYDRIDES CONTAINING CATALYST
Russell Joseph Kulick, Lenox, Mass., and Edward Strazdins, Stamford, Conn., assignors to American Cyanamid Company, Stamford, Conn.
No Drawing. Continuation-in-part of application Ser. No. 712,601, Mar. 13, 1968, now Patent No. 3,445,330, which is a continuation-in-part of applications Ser. No. 112,781, May 26, 1961, Ser. No. 420,783, Dec. 23, 1964, and Ser. No. 490,636, Sept. 27, 1965. This application Mar. 25, 1970, Ser. No. 22,696
The portion of the term of the patent subsequent to May 20, 1986, has been disclaimed
Int. Cl. C08b 25/02
U.S. Cl. 106—213                               4 Claims

ABSTRACT OF THE DISCLOSURE

The invention provides compositions comprising hydrophobic cellulose-reacting paper-sizing carboxylic acid anhydrides and a catalyst which accelerates the rate at which the anhydride develops its sizing properties when deposited on cellulose from aqueous medium and heated.

---

This is a continuation-in-part of our copending application Ser. No. 712,601, filed Mar. 13, 1968 (now U.S. Pat. No. 3,445,330), which is a continuation-in-part of our successively copending applications Ser. Nos. 490,636, 420,783 and 112,781 respectively filed Sept. 27, 1965, Dec. 23, 1964, and May 26, 1961, and now abandoned.

The present invention relates to aqueous dispersions and dry blends of hydrophobic cellulose-reactive organic paper-sizing carboxylic acid anhydrides and a latent catalyst which accelerates development of the sizing action of said anhydride. The invention includes the compositions themselves and methods for their preparation.

Nathansohn U.S. Pat. No. 1,996,707 (1935) discloses that well-sized paper is obtained when a hydrophobic organic acid anhydride [for example, distearic anhydride $CH_3(CH_2)_{16}$—CO—O—OC$(CH_2)_{16}CH_3$] is added as an anionic dispersion to paper-making cellulose pulp.

However, the process has not achieved commercial success, most probably because according to the patent 3 to 6 hours of heating at 80° C. to 110° C. are needed to develop the sizing properties of anhydride. Present-day commercial practice requires that the ultimate sizing of paper sizing agents develop more rapidly, and it is generally preferred that the sizing develop fully while the paper is drying on the machine, i.e., before it is formed into rolls. Present-day machine schedules complete the drying step in ½ minute to 3 minutes in this temperature range, or slightly above it.

More rapid development of sizing is disclosed by British Pat. No. 804,504 (1958) which employs as beater additive a dispersion of stearic anhydride and bentonite. The dispersion, however, is anionic and has evidently not been satisfactory for commercial practice.

The discovery has now been made that dispersions of hydrophobic cellulose-reactive organic anhydrides, when employed in the manufacture of paper as described above, develop their sizing very rapidly when they have a dissolved content of a water-soluble cationic salt of a cellulose-substantive water soluble polyamine. In preferred instances these novel compositions develop nearly all of their sizing during the drying stage. The cationic polyamine salt thus acts as a catalyst or promotor for the anhydride size.

The cationic polyamine salts in the compositions of the present invention are the water-soluble salts of normally water-soluble cellulose-substantive polyamines (i.e., the salts of polyamines which, in free base state, are soluble in water to the extent of at least 10% based on the weight of the water). In every instance at least a sufficient amount of the polyamine is present to render the dispersed anhydride particle cellulose-substantive, i.e., so that the anhydride particles are substantively adsorbed by cellulose paper-making fibers in aqueous suspension and to provide at least one ionic nitrogen atom for every 10 anhydride units present. This amount of cationic polyamine is sufficient to ensure a catalytic effect, i.e., a more rapid development of the sizing action of the anhydride than would otherwise be the case when the size is applied to cellulose paper-making fibers and the fibers are heated at 190°–250° F.

Polyamines which are normally substantially water-insoluble (i.e., polyamines which in free base form are less than 10% by weight soluble in water) are not of practical use in the present invention. While such polyamines may be freely water-soluble in the form of their salts (i.e., in dilute acid solution), the polyamine content of such solutions precipitates when the pH of such solutions becomes alkaline or neutral, or when the solution is made to contain polyvalent anions in amounts commonly encountered in papermill white water systems.

Suitable cationic polyamines include polyethylenimine and substantially linear polyamines, i.e., salts of polyamines which have a substantial proportion of

—$CH_2CH_2NH$— or similar linkages, for example, the 1:1 molar condensation products of trimethylenediamine with 1,2-dichloroethane or 1,3-dichloropropane; polyamidepolyamines (e.g. 1:1 molar reaction product of adipic acid with diethylenetriamine, tetraethylenepentamine or similar polyalkylenepolyamines, particularly after reaction with epichlorohydrin in the range of 0.1–1 mol per mol or ionic nitrogen present); the methylamine-ammonia-epichlorohydrin and similar resinous condensation products of Coscia U.S. Pat. No. 3,248,353; and the products formed by partially condensing polyacrylamide with ethylene diamine. There can also be used polyvinylamine; the 50:2 molar ratio acrylamide:diallyldimethyl ammonium chloride copolymer; poly-N-methyl pyridinium chloride; the 80:20 molar ratio vinylpyridine:acrylamide copolymer hydrochloride, and poly-p-chlorostyrene quaternized with trimethylamine. Suitable polymers include the water-soluble salts of water-soluble cationic starch. While less effective per unit weight than most synthetic polyamines, cationic starch is less costly. Cationic starch is a water-soluble polymer carrying sufficient cationic amino, quaternary ammonium, or other cationic groups to render the starch as a whole cellulose-substantive, and is used in the form of its water-soluble salts.

The salts referred to are the salts of polyamines with any of the common salt-forming acids, for example hydrochloric acid, hydriodic acid, hydrobromic acid, acetic acid, sulfuric acid, nitric acid, phosphoric acid, and trichloroacetic acid.

In general, best results are obtained by use of cationic salts of polyamines having a substantial molecular weight in excess of 1,000, and the more highly cationic the polymer (i.e., the more cationic groups which each polymeric macromolecule contains), the better catalysis it affords. The cationic charge of any cationic polymer salt is readily determined by standard laboratory test in an electrophoretic cell.

The minimum effective amount of the cationic polymer salt is that which renders the dispersed phase cellulose-substantive. This amount is generally sufficient to cause a perceptible catalytic action. This amount varies from instance to instance depending chiefly on the molecular weight of the polymer and its cationic charge and is likewise most easily found by laboratory trial. The optimum amount is the amount which produces the best sizing results.

It is within the scope of the invention to employ a non-ionic emulsifying agent in conjunction with the cationic polymer salt either to obtain a finer-grained dispersion or to decrease the amount of cationic agent that otherwise would be necessary.

The hydrophobic organic paper-sizing anhydrides are those which yield water-resistant paper when employed as a size. A convenient way of screening acid anhydrides is to form them into 0.2% solutions in a volatile organic solvent, and apply the solution to filter paper. The filter paper is impregnated with the solution and is then maintained at 225° F. for one hour. Development of water resistance shows that the anhydride possesses paper sizing properties.

Suitable paper-sizing cellulose-reactive anhydrides contain at least 12 carbon atoms, and our evidence is that the more the number of carbon atoms which are present in the anhydride, the better is the amount of sizing which is imparted in any instance by a given weight of the size. Suitable anhydrides include the dianhydrides formed from hydrophobic organic carboxylic acids for example myristic, palmitic, oleic, and stearic anhydrides, the corresponding polymeric anhydrides formed from dicarboxylic acids for example the 1,12-dodecanedicarboxylic acid; the $C_{44}$ and $C_{52}$ anhydrides such as those formed from fish oil acids and from cerotic acid; mixed anhydrides for example stearic acetic anhydride; and the $C_{25}$–$C_{75}$ or higher anhydrides formed by reaction of alpha olephins (derived from petroleum) with acetic anhydride.

The invention does not depend upon the particular way in which the dispersions are prepared. In general it is preferable to employ a method wherein the acid anhydride (or a mixture of acid anhydrides) is emulsified in water containing an effective amount of a high-efficiency, cationic emulsifying agent either alone or in admixture with a minor amount of an anionic emulsifying agent (the amount of anionic agent being sufficiently small that the net charge of the particle is cationic), additional cationic agent being subsequently added should the specific properties of the paper-making suspension show this to be desirable. This procedure minimizes consumption of the normally more costly cationic component while producing a finer-grained emulsion.

The organic paper-sizing acid anhydrides generally have melting points lower than 95° C. and can, therefore, be emulsified using hot water containing an appropriate emulsification agent. The higher melting agents may be emulsified by high-pressure emulsification above 100° C. or by use of solvents.

It is usually advantageous to pass the emulsion through a homogenizer to decrease the dimensions of the emulsified droplets as much as practical, after which the emulsion is immediately and rapidly cooled to form a solid-in-liquid dispersion. The emulsion is a microscopically heterogeneous mixture of the paper sizing acid anhydride droplets in a continuous aqueous phase. The droplets are predominantly below $1\mu$ in diameter and our experience is that the finer the droplets the more efficient are the sizing results. The rapid cooling converts the liquid droplets to solid particles without substantial change in dimensions.

The cationic polyamine salt may be added before, during, or after the emulsification step. When added after emulsification, it may be added before or after the sizing dispersion is cooled.

The solids content of the sizing dispersions as prepared is a matter of convenience. The dispersions are advantageously diluted to ½%–5% solids before use to ensure uniform distribution of the size through the paper pulp.

The dispersions are stable for practical purposes over a wide pH range. They are most stable at room temperature in the pH range of 3 to 5.

Size paper is prepared by use of the dispersions of the present invention by forming a suspension of cellulose-papermaking fibers in aqueous medium, adding a cationic dispersion of a paper sizing anhydride as described above, forming the fibers into a water-laid web, and drying the web at a temperature between 190° F. and 250° F. In the case of most paper this requires between about ½ and 5 minutes.

The size is effective in small amount, and between 0.1% and 0.5% of size based on the dry weight of the fibers is generally sufficient.

Best sizing generally results when the pulp has a pH between 5 and 8.

A small amount of alum, up to about 2% of the dry weight of the fibers, may advantageously be added with such polymeric agents. The alum appears to act as extender for the cationic polymer so as to increase the amount of sizing that would otherwise be produced by the size. The alum may be added after or with the cationic dispersion, but is preferably added in advance of the cationic dispersion so that the fibers have an adsorbed content of alum before the cationic polymer and the anhydride size are absorbed thereon.

If desired, the sizing dispersion may also be employed by the "tub" sizing method wherein a water-laid cellulose web is impregnated with the sizing dispersion, after which the web is dried. The presence of cationic material in the dispersion results in more rapid development of water-resistance on drying than would otherwise be the case, and here likewise acts as catalyst.

The invention includes dry blends comprising one (or more than one) paper sizing anhydride and at least sufficient of a water-soluble salt of a water-soluble cellulose-substantive cationic polyamine to render the anhydride cellulose-substantive after emulsification in water, as shown in the examples below.

The blends may contain one or more non-ionic dispersing agents to assist emulsification; colloid protectors to stabilize the emulsion; hydrophobic pigments such as titanium dioxide or ultramarine to improve the appearance of the blend, the emulsion and the paper; and perfumes to mask any odor present.

The blends form sizing emulsions when rapidly agitated with water sufficiently hot to melt the anhydride material therein. The resulting emulsion is usually advantageously homogenized and may be added to beater pulp while hot.

The agents are most conveniently added to the paper-making fibrous suspension as dilute aqueous solutions so as to facilitate metering and to ensure uniform distribution throughout the suspension.

The invention will be further illustrated by the examples which follow. These examples constitue specific embodiments of the invention and are not to be construed as limitations thereon.

EXAMPLE 1

The following illustrates the preparation of a cationic dispersion of an organic paper-sizing anhydride according to the present invention, utilizing a non-ionic dispersing agent to form an initial substantially non-ionic dispersion which is converted to cationic cellulose-substantive form by addition of a water-soluble cationic resin.

To 50 ml. of water at 80° C. containing 2 g. of polyoxyethylene sorbitol oleate laurate (Atlox 1045A, a non-ionic dispersing agent) are added with rapid stirring 10 g. of molten distearic anhydride. A fluid, creamy, substantially non-ionic dispersion forms.

This is slowly added with rapid stirring to 930 ml. of water at 80° C. and pH 4 containing 10 g. of the resin prepared by reacting to a Gardner-Holdt viscosity of R, 0.2 mol of tetraethylenepentamine with 0.6 mol of epichlorohydrin as shown in Example 1 of Daniel et al. U.S. Pat. No. 2,595,935 (1952). The product is the water-soluble salt of a water-soluble polyamine. The resulting emulsion is homogenized hot and is then rapidly cooled to room temperature. The product is a cationic cellulose, substantive dispersion containing 1.0% of distearic anhydride which undergoes negligible decrease in sizing efficiency when stored for more than two days at room temperature without pH adjustment, and for more than a week when stored at pH 4.

EXAMPLE 2

The following illustrates the preparation of a cellulose-substantive dispersion of a paper-sizing acid anhydride by means of a cationic agent which acts as its own emulsifier.

In 600 ml. of water at 80° C. are dissolved 20 g. of a water-soluble cationic starch [a salt of a water-soluble starch carrying —CH$_2$CH$_2$N(CH$_3$)$_2$ substituents with a water-soluble acid; cf. U.S. Pat. No. 2,935,436 (1960)] and 10 g. of molten distearic anhydride are slowly added with vigorous agitation. The resulting emulsion which contains 1.6% by weight of distearic anhydride is homogenized hot in a laboratory homogenizer and is then rapidly cooled to room temperature.

EXAMPLE 3

The following illustrates the catalytic effect of water-soluble cationic polymers in accelerating the rate at which carboxylic anhydride paper sizes develop their sizing when they are deposited on cellulose fibers in anhydrous medium, and the fibers are then dried and heated briefly in the range of 190° F. to 250° F.

A sheet of 100 lb. basis weight 50:50 bleached hardwood:bleached softwood water-laid (i.e., untreated) paper is torn in half. One sheet (sheet A) is left untreated as control. The other half (sheet B) is impregnated with a 0.15% by weight solution of the water-soluble salt of the water-soluble polyamine prepared by condensing a 1:1 molar ratio adipic:tetraethylenepentamine reaction product with about 0.3 mol of epichlorohydrin to a point close to but short of gelation. The resulting sheet is dried in a laboratory drying oven at 190° F.

Both sheets are immersed together in a 0.2% by weight solution of stearic anhydride in carbon tetrachloride until they are saturated, after which they are removed and air dried. Since the size was applied from voltatile anhydrous medium on removal from the solution, both sheets contain identical amounts of stearic anhydride (0.15% by weight). The sheets are then cured by passage for 90 seconds over a laboratory drum drier having a drum temperature of 230° F.

The amount of sizing which is developed by the anhydride is determined by applying drops of 20% aqueous lactic acid to the sheets and noting the length of time during which the drops remain unabsorbed on the sheets. Results are as follows:

| Sheet: | Percent stearic anh. in paper | Percent polyamine in paper | Seconds heated at 230° F. | Lactic acid sizing secs. |
|---|---|---|---|---|
| A | 0.15 | None | 90 | 196 |
| B | 0.15 | 0.15 | 90 | [1] 2,440 |

[1] From previous experience it is known that the sizing developed by Sheet B is in excess of 80% of its ultimate sizing.

Since the only variable in the foregoing procedure is the percent of the polyamine, the results shown in classical fashion that the cationic polymer exerts a pronounced catalytic effect on the rate at which the stearic anhydride develops its sizing.

EXAMPLE 4

The following illustrates the catalytic effect of a cationic water-soluble polyamine having a substantial molecular weight and a high cationic charge in accelerating the rate at which carboxylic anhydride paper sizes develop their sizing when they are deposited on cellulose fibers in aqueous medium and the fibers are then dried and heated in the range of 190° F. to 250° F.

A sheet of the same (100 lb. basis weight) water-leaf paper as is used for Example 3 is immersed in a 0.1% by weight water solution of the water-soluble salt of the strongly cationic water-soluble polyamine formed by reacting a 1:1 molar ratio adipic acid:tetraethylenepentamine condensate with 0.3 mol of epichlorohydrin in water to a point near to but short of gelation. The paper is then dried by heating for 1 minute in an oven at 240° F. The resulting sheet contains 0.148% of its dry weight of the polyamine. The sheet is then impregnated by immersion of 10 seconds in an aqueous dispersion containing 0.2% by weight of stearic anhydride in an aqueous medium containing cationic starch and sodium lignosulfonate as emulsifying agents. The resulting paper contains 0.291% of stearic anhydride based on its dry weight and is placed in a forced draft oven for 2 minutes at 230° F.

The sizing of the paper is determined by penescope application of a 20% by weight aqueous lactic acid solution at 100° F. under a 12″ head. The sheet resists penetration by this fluid for more than 7,200 seconds.

In the absence of the polyamine, this sheet would possess substantially no resistance to the fluid and would behave as if it were unsized paper.

EXAMPLE 5

The procedure of Example 1 is repeated except that 20 g. of the urea-formaldehyde-triethylenetetramine resin of U.S. Pat. No. 2,657,132 is used in place of the amine-epichlorohydrin resin employed therein. A similar emulsion is obtained.

EXAMPLE 6

The procedure of Example 1 is repeated except that as cationic agent there is used 10 g. of the water-soluble diethylenetriamine-adipic acid-epichlorohydrin resin prepared as disclosed in Keim U.S. Pat. No. 2,926,154 (1960). A similar dispersion is obtained.

EXAMPLE 7

The procedure of Example 1 is repeated using a sizing agent stearic acetic anhydride $$[CH_3(CH_2)_{16}CO—O—OCCH_3]$$

The agent is prepared by reacting stearoyl chloride and glacial acetic acid in diethyl ether solution at 10° C. in the presence of pyridine as acid acceptor. A similar dispersion is obtained.

EXAMPLE 8

The following illustrates the preparation of a cationic emulsion which yields excellent sizing values and which remains chemically and physically stable for a long time.

To 908 cc. of water at 80° C. containing 30 g. of the dissolved cationic starch of Example 2 is added 1.5 g. of sodium lignosulfonate ("Marasperse N"). To this is run in with vigorous agitation 30 g. of molten stearic anhydride. The resulting emulsion is homogenized hot, and rapidly cooled. To the resulting dispersion is then added 0.4 g. of sodium hydroxide dissolved in a little water.

This process is disclosed and claimed in Savina U.S. Pat. No. 3,223,543.

EXAMPLE 9

The procedure of Example 8 is repeated except that 10 g. of naphthenic anhydride (prepared from petroleum naphthenic acids) is used in place of the stearic anhydride. A similar dispersion is obtained.

EXAMPLE 10

The procedure of Example 1 is repeated using a water-soluble 89:1 weight ratio acrylamide:diallyl dimethyl ammonium chloride copolymer as the cationic agent.

EXAMPLE 11

The following illustrates the rapidity with which the dispersions of the present invention develop their sizing.

An aqueous suspension of beaten 50% bleached sulfite 50% bleached hardwood pulp at 0.6% consistency is divided into aliquots, and to each is added a small amount of one of the dispersions described, as shown in the table below. The pH of the aliquots is then adjusted to 7, the aliquots are gently stirred for a few minutes to permit adsorption of the anhydride size, after which the aliquots are made into handsheets on a Noble & Wood handsheet machine at a basis weight of about 200 lbs. per 25"/40" x 500 ream.

The handsheets are dried at 250° F. on a laboratory drum drier (two passes of 1.5 mins. each) and the lactic acid resistance of the sheets is then determined, using 20% lactic acid solution applied by penescope under a 12-inch head at 100° F. These results indicate the amount of sizing which is developed by the paper while in the papermaking machine.

The sheets are then cured in an oven for one hour at 220° F. and their lactic acid resistance determined once again to show the ultimate sizing developed in each instance by the acid anhydride. Results are as follows.

| Ex. No.[1] | Sizing dispersion | | | | Sizing[4] developed after— | | Percent of final sizing developed on drier[5] |
|---|---|---|---|---|---|---|---|
| | Sizing anhydride | | Cationic agent | | Drying at 250° F., 3 min. | Oven curing at 220° F., 1 hr. | |
| | Name | Percent[2] | Name[3] | Percent[2] | | | |
| 1 | Distearic | 0.3 | TEPA-epi resin | 0.3 | 3,600 | 3,600 | 100 |
| 2 | do | 0.3 | Cationic starch | 0.6 | 2,500 | 3,600 | 70 |
| 3 | do | 0.5 | U-F-TETA resin | 2.0 | 240 | 320 | 75 |
| 4 | do | 0.3 | DETA-adipic-epi | 0.3 | 3,600 | 3,600 | 100 |
| 5 | Stearic acetic | 0.3 | TEPA-epi | 0.2 | 420 | 600 | 70 |
| 6 | Distearic | 0.2 | Cationic starch | 0.8 | [6]3,600 | 3,600 | 100 |
| 7 | Naphthenic | 0.5 | TEPA-epi | 0.2 | 410 | 550 | 68 |
| 8 | Distearic | 0.2 | AM-DADM resin | 0.75 | 3,600 | 3,600 | 100 |

[1] Example number; see text for details.
[2] Based on dry weight of fibers.
[3] TEPA=tetraethylenepentamine; epi=epichlorohydrin; U-F-TETA=urea-formaldehyde-triethylenetetramine; DETA=diethylenetriamine; AM-DAMD=acrylamide-diallyldimethyl ammonium chloride.
[4] Seconds, using 20% lactic acid solution under 12"-head.
[5] All values in excess of 3,600 seconds are considered equal.
[6] The sizing developed after 1.5 minutes of drying is 510 seconds.

EXAMPLE 12

The following illustrates the effect on sizing of changes in the amounts of sizing anhydride and cationic resin applied to the pulp.

To 500 cc. of water at 80° C. are added with vigorous stirring 0.3 g. of gum ghatti, 1.5 g. of the naphthalenesulfonic acid-formaldehyde emulsifying agent known as Lomar D, and 3 g. of technical grade molten distearic anhydride containing 6% unreacted stearic acid. The resulting emulsion is homogenized hot and immediately and rapidly cooled.

Aliquots are taken from a well beaten 50:50 bleached sulfite:bleached hardwood pulp and treated first with the sizing dispersion and then with an aqueous solution of the tetraethylene-pentamine-epichlorohydrin resin of Example 1, in amounts shown in the table below.

The aliquots are formed into handsheets at 100 lb. basis weight (25" to 40"/500 ream), dried for three minutes at 250° F. and their lactic acid resistance determined, all by the method of Example 1. Results are as follows:

| | Percent cationic resin added | Percent distearic anhydride added[1] | Lactic acid resistance,[2] seconds |
|---|---|---|---|
| Control | None | 0.3 | Instant |
| Run No.: | | | |
| 1 | 0.05 | 0.3 | 1,000 |
| 2 | 0.1 | 0.3 | 2,000 |
| 3 | 0.3 | 0.3 | 3,500 |
| 4 | 0.6 | 0.3 | 700 |
| 5 | 1.0 | 0.3 | 500 |
| 7 | 0.3 | 0.1 | Instant |
| 8 | 0.3 | 0.2 | 700 |
| 9 | 0.3 | 0.3 | 3,500 |
| 10 | 0.3 | 0.5 | 7,200 |

[1] On dry weight of fibers.
[2] Developed after drying at 250° F. for 3 minutes.

Comparison of run 3 with run 4 illustrates the effect of the presence of more than a suitable amount of the cationic polymer.

EXAMPLE 13

The following illustrates the preparation of a substantially anhydrous autodispersible sizing mixture comprising an organic paper sizing anhydride and a water-soluble anionic dispersing agent. The dispersing agent is sodium lignosulfonate, and a dry blend is formed of 15 g. of this material, 300 g. of a water-soluble cationic starch, and 600 g. of crushed stearic anhydride. The mixture is powdered and forms a stable dispersion when 8 g. are slowly added to 200 cc. of rapidly agitated boiling water. The resulting dispersion is immediately cooled to room temperature and is used in the manufacture of sized paper as described in Example 1 with similar results.

EXAMPLE 14

The following illustrates the apparent wet strength possessed by paper of the present invention.

A strip 1" wide and 5" long is cut from paper according to the present invention having a content of 0.3% of distearic anhydride and 1% of cationic starch. The paper is suspended in water having a pH of 8.4 (sodium bicarbonate buffer) and temperature of 20° C., under 1 kg. of tension.

The paper is apparently unaffected after 24 hours of the test. A control strip of paper containing 1% of alum-deposited fortified gum rosin size breaks under the tension in 30 minutes.

EXAMPLE 15

The following illustrates the effectiveness of the cationic components of acid anhydride sizing dispersions according to the present invention in the treatment of paper by the "tub sizing" method. The sizing dispersion used is that of Example 8 except that only 15 g. of cationic starch was used. The dispersion was diluted to 0.38% stearic anhydride content by addition of water.

An unsized paper sheet prepared by water-laying an untreated but well beaten 50% bleached sulfate:50% bleached hardwood pulp at a basis weight of 200 lbs. per 25" x 40"/500 ream is dried at 100° C. for 3 minutes and is then immersed for 2 seconds in the sizing dispersion. The sheet is passed through a press to remove excess (unadsorbed) dispersion and is found to have picked up 79% of its weight of the dispersion and therefore contains 0.3% by weight of the anhydride size and half that amount of the cationic starch.

The sheet is then dried for 3 minutes at 105° C. The lactic acid resistance of the sheet treated as described above is in excess of 3600 seconds.

EXAMPLE 16

The following illustrates the large-scale preparation and testing of a cationic distearic anhydride emulsion prepared by emulsification of distearic anhydride by the action of a cationic emulsifying agent in admixture with a minor amount of an anionic emulsifying agent, followed by addition of a supplementary cationic agent so as to form a strongly cationic sizing composition.

An emulsifying medium composed of water having a dissolved content of 5% by weight of cooked cationic starch and 0.6% of sodium lignosulfonate is continously supplied at 75° C. to a centrifugal pump and thence to a homogenizer. Into the emulsifying medium immediately upstream from the pump is continuously introduced distearic anhydride at 85° C. at a rate equal to 15% of the weight of the medium. The centrifugal pump forms the components into a crude emulsion and the homogenizer produces a stable emulsion. The discharge from the homogenizer is diluted to 3% distearic anhydride content and is simultaneously cooled by introduction of cold (15° C.) water containing 2% by weight of a cationic tetraethylenepentamine-adipic acid-epichlorohydrin resin. The resulting dispersion is a pumpable cream.

The cationic resin employed above is prepared by reacting 1 mol of adipic acid with 1 mol of tetraethylenepentamine at 170° C. to form a polyamidepolyamine, dissolving the polyamidepolyamine in water and reacting it with 0.3 mol of epichlorohydrin as is shown in copending application Ser. No. 281,321 filed on May 17, 1963 by Edward Strazdins and Ronald R. House now U.S. Pat. No. 3,329,657.

The resulting strongly cationic distearic anhydride dispersion is supplied to the fan pump inlet of a papermaking machine which produces food wrapping paper having a basis weight of 40 lb. per 25" x 40"/500 ream at a speed of about 1,000 feet per minute. The furnish to the machine is a suspension of well-beated bleached kraft pulp in water which contains 0.3% alum based on the dry weight of the fibers and which has a pH of 6.2. The sizing dispersion is supplied at a rate sufficient to provide 1.5 lb. of distearic anhydride per ton of pulp. In the machine, the water-laid web is dried to about 50% water content on predrier rolls having surface temperatures from 210° to 240° F., and is then substantially completely dried by passage over a Yankee drier having a surface temperature of about 240° F. The dwell time of the paper in the drier section of the machine is about 30 seconds. The paper is formed into a roll immediately on exiting from the machine at 200° F. or higher.

The sizing of a sample of the paper is determined as produced, by the TAPPI ink float test and on a sample of the paper which was given an extra heating at 110° C. for 5 minutes to substantially develop the ultimate sizing properties of the distearic anhydride therein. Results are as follows:

| Paper | TAPPI ink sizing, seconds | Percent of ultimate sizing developed on machine |
|---|---|---|
| As produced | 80 | |
| After extra heating | 85 | 94.0 |

EXAMPLE 17

The procedure of Example 3 is repeated except that the anhydride in the size composition is the dianhydride of fish oil fatty acids (containing about 44 carbon atoms per molecule). The sizing of the resulting paper is substantially better than that of control paper made in the same way except that the anhydride in the sizing composition is distearic anhydride.

EXAMPLE 18

The procedure of Example 3 is repeated except that the anhydride in the size composition is the dianhydride of cerotic acid (containing 52 carbon atoms per molecule). The sizing of the resulting paper is better than that of the paper of Example 17 made by the use of the dianhydride of fish oil fatty acids.

We claim:
1. An aqueous dispersion consisting essentially of hydrophobic cellulose-reactive paper-sizing carboxylic acid anhydride particles and a latent catalyst therefor, said catalyst being a watter-soluble cationic salt of a cellulose-substantive water-soluble cationic polyamine having a molecular weight in excess of 1,000, the amount of said polyamine salt being at least sufficient to render said anhydride particles substantive to cellulose paper-making fibers in aqueous suspension and to accelerate the rate at which said anhydride develops its sizing properties when applied to cellulose papermaking fibers and heated thereon at 190°–250° F. and to provide at least one ionic nitrogen atom for every anhydride unit present, said composition being stable to 1000 p.p.m. of dissolved sulfate ions and being stable in the pH range of 4–10, and being useful as a beater-addable sizing agent in paper manufacture; said anhydride containing at least 12 carbon atoms, said polyamine in free base state being soluble to the extent of at least 10% by weight in water.

2. A dispersion according to claim 1 wherein the carboxylic acid anhydride is distearic acid anhydride.

3. A dispersion according to claim 1 wherein the polyamine salt is a water-soluble cationic salt of cationic starch.

4. A dispersion according to claim 1 having a pH between 3 and 5.

References Cited

UNITED STATES PATENTS 2,099,363   11/1937   Heckert _____ 8—116.2
2,935,436   5/1960   Caldwell _____ 162—164

THEODORE MORRIS, Primary Examiner

U.S. Cl. X.R.

162—164; 260—29.2

UNITED STATES PATENT OFFICE
CERTIFICATE OF CORRECTION

Case 23,528

Patent No. 3,666,512      Dated May 30, 1972

Inventor(s) Russell Joseph Kulick and Edward Strazdins

It is certified that error appears in the above-identified patent and that said Letters Patent are hereby corrected as shown below:

Column 1 line 29, after "Nos." insert -- 712,601; Column 1 line 30, after "filed" insert -- March 13, 1968 --.
Column 2 line 5, "particle" should read -- particles --.
Column 4 line 1, "Size" should read -- Sized --; Column 4 line 52, "constitue" should read -- constitute --.
Column 5 line 1, "cellulose, substantive" should read -- cellulose-substantive --.
Column 6 line 75, "fite 50%" should read -- fite - 50% --.
Column 7 in the table, footnote 3 "AM-DAMD" should read -- AM-DADM --.
Column 10 line 23, "watter" should read -- water --.

Signed and sealed this 1st day of May 1973.

(SEAL)
Attest:

EDWARD M. FLETCHER, JR.      ROBERT GOTTSCHALK
Attesting Officer      Commissioner of Patents